US012615231B1

(12) United States Patent
Mouslmani et al.

(10) Patent No.: US 12,615,231 B1
(45) Date of Patent: Apr. 28, 2026

(54) MULTI-PLATFORM UNIFIED COMMUNICATIONS SYSTEM

(71) Applicants: Taleb John Mouslmani, Morrisville, NC (US); Mathew Danish, Thornton, CO (US)

(72) Inventors: Taleb John Mouslmani, Morrisville, NC (US); Mathew Danish, Thornton, CO (US)

( * ) Notice: Subject to any disclaimer, the term of this patent is extended or adjusted under 35 U.S.C. 154(b) by 49 days.

(21) Appl. No.: 18/888,878

(22) Filed: Sep. 18, 2024

Related U.S. Application Data

(60) Provisional application No. 63/539,085, filed on Sep. 18, 2023.

(51) Int. Cl.
*G06F 15/16* (2006.01)
*H04L 51/56* (2022.01)

(52) U.S. Cl.
CPC .................................. *H04L 51/56* (2022.05)

(58) Field of Classification Search
None
See application file for complete search history.

(56) References Cited

U.S. PATENT DOCUMENTS

2017/0339065 A1* 11/2017 Li ....................... H04L 47/2416

* cited by examiner

*Primary Examiner* — Wing F Chan
*Assistant Examiner* — Andrew Woo
(74) *Attorney, Agent, or Firm* — Gregory Finch; Finch Paolino, LLC

(57) ABSTRACT

A multi-platform unified communications system to enable bi-directional communication and presence management between different UC applications. Certain benefits and advantages of the present disclosure include a multi-platform unified communications system configured to provide the unified ability to collaborate between multiple platforms within a single unified "single pane of glass" or UI. The multi-platform unified communications system of the present disclosure would sit segregated or integrated on or across one or more servers, enabling UC communications across multiple platforms within a single end-user application.

1 Claim, 3 Drawing Sheets

1

MULTI-PLATFORM UNIFIED COMMUNICATIONS SYSTEM

CROSS-REFERENCE TO RELATED APPLICATIONS

This application claims the benefit of U.S. provisional patent application 63/539,085, entitled "MULTI-PLAT-FORM UNIFIED COMMUNICATIONS SYSTEM" and having a filing date of Sep. 18, 2023, the disclosure of which is incorporated herein at least by virtue of this reference.

FIELD

The present disclosure relates to the field of unified communications (UC) platforms; in particular, a multi-platform unified communications system to enable bi-directional communication and presence management between disparate UC applications.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

A unified communication system comprising a unified communication server comprising a first unified communications application executing thereon, wherein the first unified communication application comprises a user interface for receiving one or more unified communications from one or more users, wherein the one or more unified communications comprise one or more video communications, chat communications, documents and/or files; one or more servers communicably engaged with the unified communication server via a at least one application programming interface, wherein the one or more servers are configured to execute a second or subsequent unified communications application thereon, wherein the second or subsequent unified communications application is different from the first unified communication application; and one or more client devices communicably engaged with the one or more servers via a network communications interface, wherein the one or more client devices are configured to execute one or more instances of the second or subsequent unified communications application, wherein the unified communication server is configured to communicate the one or more unified communications to each of the second or subsequent unified communications application.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
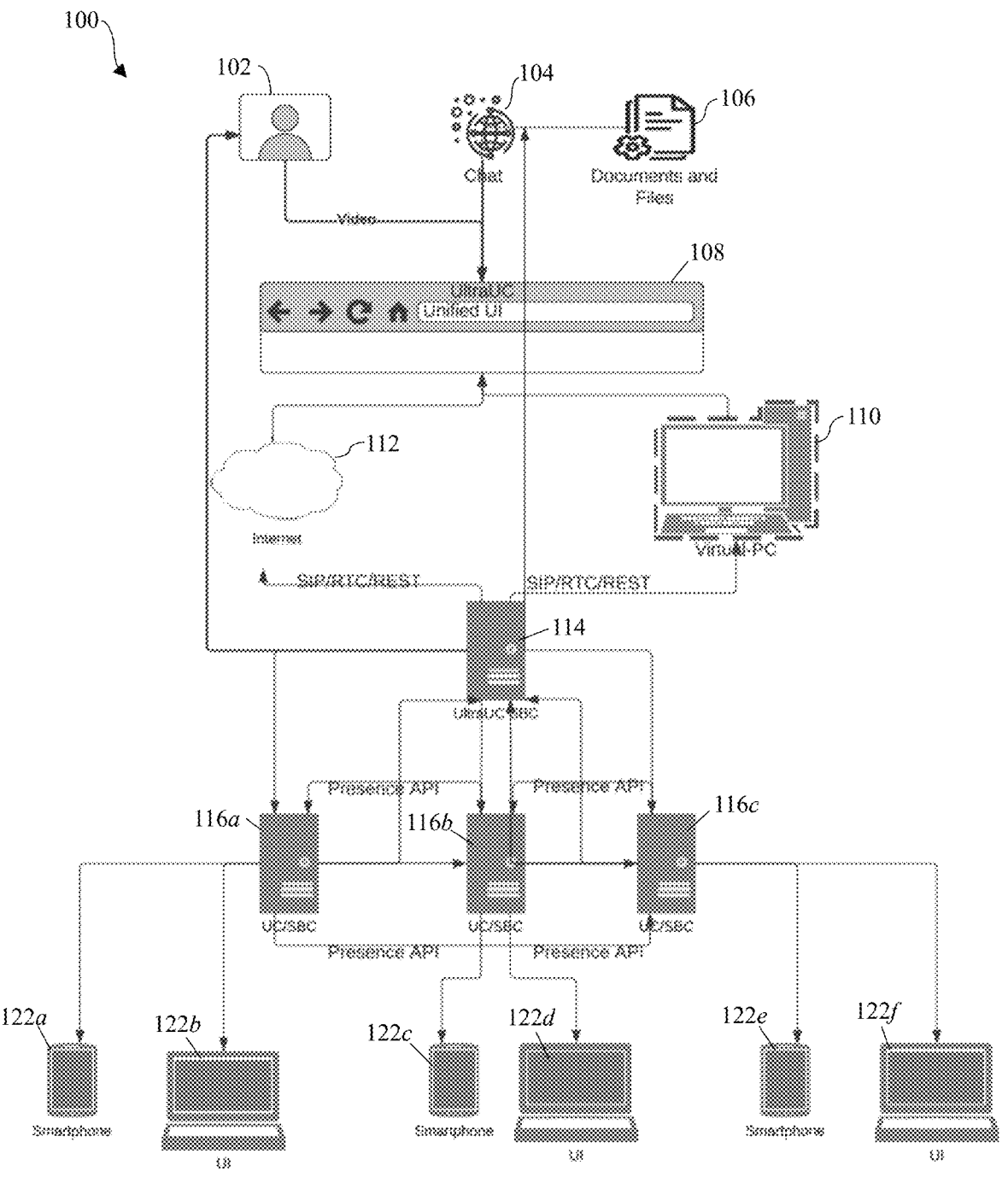
FIG. 1 is an architecture diagram of a multi-platform unified communications system, in accordance with certain aspects of the present disclosure.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive methods, apparatus and systems configured to provide for a multi-platform unified communications system configured to provide the unified ability to collaborate between multiple platforms within a single unified "single pane of glass" or UI. The multi-platform unified communications system of the present disclosure would sit segregated or integrated on or across one or more servers, enabling UC communications across multiple platforms within a single end-user application.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Before the present invention and specific exemplary embodiments of the invention are described, it is to be understood that this invention is not limited to the particular embodiments described, and as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof.

Certain benefits and advantages of the present disclosure include a multi-platform unified communications system configured to provide the unified ability to collaborate between multiple platforms within a single unified "single pane of glass" or UI. The multi-platform unified communications system of the present disclosure would sit segregated or integrated on or across one or more servers, enabling UC communications across multiple platforms within a single end-user application.

Certain objects and advantages of the present disclosure include a distributed computing architecture for a universal Session Border Controller (SBC) system. Certain embodiments of the SBC system are designed to be API-centric, enabling seamless integration of telephony, unified communications (UC), and customer relationship management (CRM) systems through a flexible and scalable API framework. In accordance with certain aspects of the present disclosure, the SBC facilitates communication between various telephony systems, UC platforms like MICROSOFT TEAMS, and CRM applications by leveraging SIP and WebRTC for telephony signaling. In accordance with certain embodiments, core functionality may be built around APIs that enable real-time session control, call routing, and media handling. These APIs expose telephony features such as call initiation, termination, and transfer, making it possible to integrate voice communication directly into CRM applications and other software systems.

Certain objects and advantages of the present disclosure include API gateways to configured manage communication between the SBC system and external systems, allowing for dynamic interaction with multiple SIP trunks and UC platforms. The API-based middleware layer may be configured to enable protocol translation and ensure that all API calls related to telephony are translated into the appropriate SIP messages or media streams. This enables seamless interoperability between cloud UC services, contact center platforms, and CRM systems that require telephony features such as click-to-dial or call pop-ups. The API framework is designed to be modular, supporting custom integrations and extensions that allow businesses to tailor the telephony functionality to their specific needs.

Certain objects and advantages of the present disclosure include an SBC system with a high degree of security and scalability. In accordance with certain aspects of the present disclosure, the SBC system offers APIs for monitoring and managing telephony traffic, allowing real-time control over sessions and media streams. Encryption is enforced via secure API connections (e.g., using TLS) and secure real-time transport protocols (SRTP) for media streams. API-based monitoring and logging systems track call performance, quality of service (QoS), and any security breaches, ensuring that the system scales efficiently while maintaining robust defenses against threats like DoS attacks. This API-driven approach to telephony enables businesses to integrate and customize their communications infrastructure, creating a unified, scalable platform that evolves with the latest in telephony and UC technologies.

Referring now to FIG. 1, an architecture diagram of a multi-platform unified communications system 100 is shown. In accordance with certain aspects of the present disclosure, system 100 comprises a unified communications application 108 configured to communicate and connect with managed single-board computers (SBCs) bidirectionally to transfer session-initiated protocol (SIP) and/or fully qualified domain name (FQDN) data to allow the capability of communication and presence management between different UC applications. In accordance with certain embodiments, application 108 can be accessed by individual UI or by embeddable frameworks enabled by SKDs to be integrated in external applications authenticated by OAUTH tokens. Application 108 can thereby be accessed anywhere either by direct login or by external login externally through integrations in a third-party application. In accordance with certain aspects of the present disclosure, system 100 would enable end users to communicate via chat and video between UC platforms such as MICROSOFT TEAMS, WEBEX, ZOOM, GENESYS UC and the like, via SBC and SIP.

As shown in FIG. 1, system 100 may comprise an "ultra" unified communication server (or SBC) 114. Ultra SBC 114 may be configured to host application 108. Ultra SBC 114 may be configured to facilitate one or more data transfer protocols between Ultra SBC 114 and a user interface of application 108 via a virtual PC 110 and/or an internet connection 112. The one or more data transfer protocols may comprise one or more SIP, RTC and/or REST protocols. Application 108 may be configured to receive one or more user communications including, for example, one or more video 102, chat 104 (e.g., text or voice) and documents and files 106. Ultra SBC 114 may be communicably engaged with one or more additional SBCs 116a-c. In certain embodiments, SBCs 116a-c may comprise third-party SBCs. In accordance with certain embodiments, Ultra SBC 114 may provide for integration across SBCs 116a-c via a presence API or other protocol. In accordance with certain aspects of the present disclosure, a plurality of client devices 122a-f may be communicably engaged with SBCs 116a-c. In accordance with certain aspects of the present disclosure, client devices 122a-f may be able configured to send and receive UC communications across multiple platforms within an end user instance of application 108.

Figure 2:
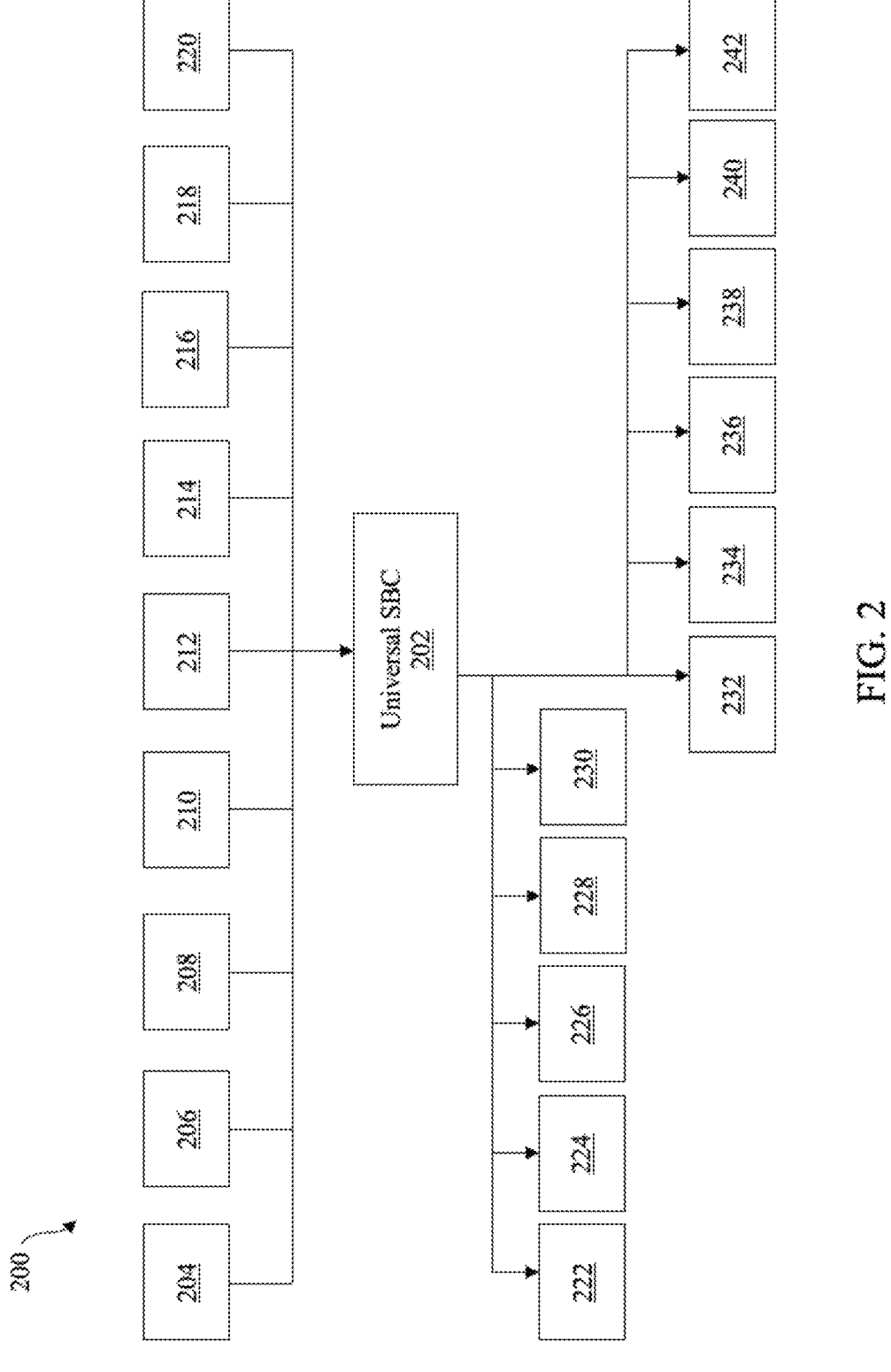
FIG. 2 is a functional block diagram of a universal session border controller system, in accordance with certain aspects of the present disclosure.

Referring now to FIG. 2, a functional block diagram of a universal session border controller system 200 is shown. In accordance with certain aspects of the present disclosure, system 200 may be implemented within the architecture of system 100, as shown in FIG. 1. In accordance with certain aspects of the present disclosure, system 200 may comprise a universal SBC 202 configured to manage communications between a plurality of contact center as a service (CCaaS)

and unified communications as a service (UCaaS) platforms 204-220 and a plurality of client devices. In accordance with certain embodiments, universal SBC 202 may be communicably engaged (e.g., via one or more API) with an external telephony system 204 (e.g., MICROSOFT TEAMS) to directly route communications data therefrom. In certain embodiments, universal SBC 202 may be communicably engaged (e.g., via one or more API) with one or more UCasS system 206 for meetings and communications (e.g., ZOOM). In certain embodiments, universal SBC 202 may be communicably engaged (e.g., via one or more API) with one or more web conferencing and UCaas system 208 (e.g., CISCO WEBEX). In certain embodiments, universal SBC 202 may be communicably engaged (e.g., via one or more API) with one or more cloud-based content center solution 210 (e.g., SALESFORCE). In certain embodiments, universal SBC 202 may be communicably engaged (e.g., via one or more API) with one or more CCaaS platform 212 for contact centers (e.g., FIVE9). In certain embodiments, universal SBC 202 may be communicably engaged (e.g., via one or more API) with one or more UCaaS system 214 comprising phone, messaging and video (e.g., RINGCENTRAL). In certain embodiments, universal SBC 202 may be communicably engaged (e.g., via one or more API) with one or more cloud contact center and CCaaS platform 216 (e.g., GENESYS). In certain embodiments, universal SBC 202 may be communicably engaged (e.g., via one or more API) with one or more CCaaS system 218 comprising one or more advanced workforce optimization features (e.g., NICE INCONTACT). In certain embodiments, universal SBC 202 may be communicably engaged (e.g., via one or more API) with one or more cloud-based contact center service 220 such as those provided by AMAZON WEB SERVICES. In accordance with certain aspects of the present disclosure, universal SBC 202 may be configured to receive and process communications received by each of the foregoing platforms and provide a plurality of services to one or more networked client devices within the context of a unified communications framework. In certain embodiments, universal SBC 202 is configured to execute one or more session control functions 222 to manage SIP sessions (e.g., calls) between one or more client devices. In certain embodiments, universal SBC 202 is configured to execute one or more interworking functions 224 to translate protocols like SIP, RTP, and WebRTC. In certain embodiments, universal SBC 202 is configured to execute one or more network security functions 226 to handle encryption, authentication and firewall between said platforms and the one or more networked client devices. In certain embodiments, universal SBC 202 is configured to execute one or more data transfer protocols 228 such as Support SIP, WebRTC, H.323, SIP-T/SIP-I, and RTP/SRTP. In certain embodiments, universal SBC 202 is configured to execute one or more networking functions 230 to manage LAN/WAN connectivity, SIP trunks, SD-WAN, cloud UCaaS and the like. In certain embodiments, universal SBC 202 is configured to execute one or more unified communications (UC) functions 232 to integrate one or more UC platforms (e.g., MICROSOFT TEAMS), cloud UC providers, and CRM. In certain embodiments, universal SBC 202 is configured to execute one or more scalability operations 234 to perform functions such as load balancing, clustered SBCs, vSBCs, and autoscaling. In certain embodiments, universal SBC 202 is configured to execute one or more cyber security functions 236 such as encryption, DoS protection, and firewall. In certain embodiments, universal SBC 202 is configured to execute one or more network monitoring functions 238 such as real-time monitoring, SLA enforcement and logging and auditing. In certain embodiments, universal SBC 202 is configured to execute one or more telephony functions 240 such as SIP trunks for telephony, hybrid on-premises and cloud UC. In certain embodiments, universal SBC 202 is configured to execute one or more additional functions 242 such as interoperability and middleware for one or more APIs.

Figure 3:
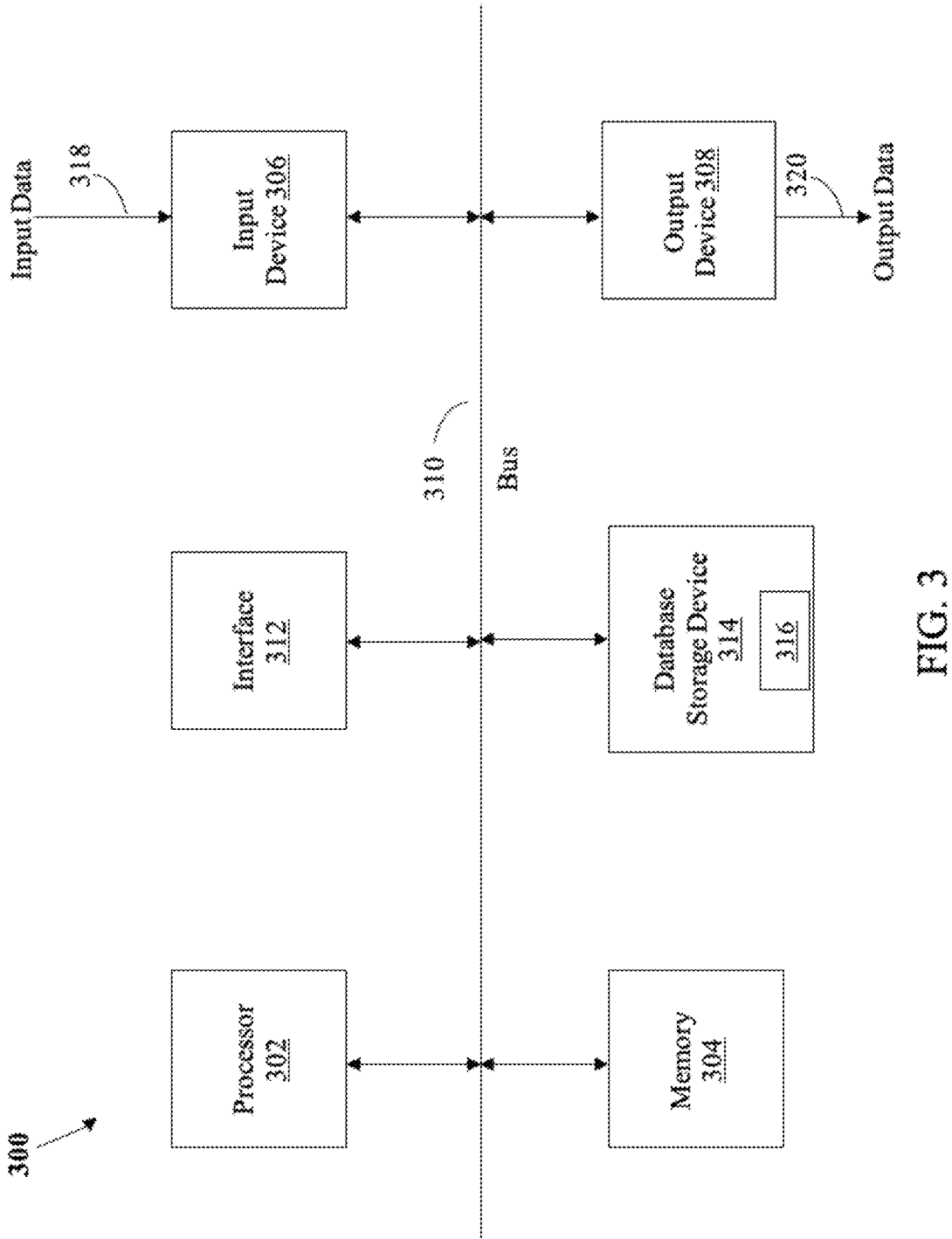
FIG. 3 is a functional diagram of a processor-implemented computing device through which one or more aspects of the present disclosure may be implemented.

Referring now to FIG. 3, a functional diagram of a processor-implemented computing device in which one or more aspects of the present disclosure may be implemented is shown. According to an embodiment, a processing system 300 may generally comprise at least one processor 302, or processing unit or plurality of processors, memory 304, at least one input device 306 and at least one output device 308, coupled together via a bus or group of buses 310. In certain embodiments, input device 306 and output device 308 could be the same device. An interface 312 can also be provided for coupling the processing system 300 to one or more peripheral devices, for example interface 312 could be a PCI card or PC card. At least one storage device 314 which houses at least one database 316 can also be provided. The memory 304 can be any form of memory device, for example, volatile or non-volatile memory, solid state storage devices, magnetic devices, etc. The processor 302 could comprise more than one distinct processing device, for example to handle different functions within the processing system 300. Input device 306 receives input data 318 and can comprise, for example, a keyboard, a pointer device such as a pen-like device or a mouse, audio receiving device for voice-controlled activation such as a microphone, data receiver or antenna such as a modem or wireless data adaptor, data acquisition card, etc. Input data 318 could come from different sources, for example keyboard instructions in conjunction with data received via a network. Output device 308 produces or generates output data 320 and can comprise, for example, a display device or monitor in which case output data 320 is visual, a printer in which case output data 320 is printed, a port for example a USB port, a peripheral component adaptor, a data transmitter or antenna such as a modem or wireless network adaptor, etc. Output data 320 could be distinct and derived from different output devices, for example a visual display on a monitor in conjunction with data transmitted to a network. A user could view data output, or an interpretation of the data output, on, for example, a monitor or using a printer. The storage device 314 can be any form of data or information storage means, for example, volatile or non-volatile memory, solid state storage devices, magnetic devices, etc.

In use, the processing system 300 is adapted to allow data or information to be stored in and/or retrieved from, via wired or wireless communication means, at least one database 316. The interface 312 may allow wired and/or wireless communication between the processing unit 302 and peripheral components that may serve a specialized purpose. In general, the processor 302 can receive instructions as input data 318 via input device 306 and can display processed results or other output to a user by utilizing output device 308. More than one input device 306 and/or output device 308 can be provided. It should be appreciated that the processing system 300 may be any form of terminal, server, specialized hardware, or the like.

It is to be appreciated that the processing system 300 may be a part of a networked communications system. Processing system 300 could connect to a network, for example the Internet or a WAN. Input data 318 and output data 320 could be communicated to other devices via the network. The transfer of information and/or data over the network can be achieved using wired communications means or wireless communications means. A server can facilitate the transfer of data between the network and one or more databases. A server and one or more databases provide an example of an information source. Thus, the processing computing system environment 300 illustrated in FIG. 3 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 3 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 300 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 300, or portions thereof, may be stored in a remote memory storage device. It is to be appreciated that the illustrated network connections of FIG. 3 are exemplary and other means of establishing a communications link between multiple computers may be used.

FIG. 3 is intended to provide a brief, general description of an illustrative and/or suitable exemplary environment in which embodiments of the below described present invention may be implemented. FIG. 3 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the foregoing description, certain embodiments have been described with reference to acts and symbolic representations of operations that are performed by one or more computing devices, such as the computing system environment 300 of FIG. 3. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Any publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be performed in an order other than the order illustrated, may be combined or divided, or may be performed simultaneously. It will also be understood that the blocks of the block diagrams illustrate, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A unified communication system comprising:

a unified communication server comprising a first unified communications application executing thereon, wherein the first unified communication application comprises a user interface for receiving one or more unified communications from one or more users, wherein the received one or more unified communications comprise one or more video communications, chat communications, documents and/or files;

one or more servers communicably engaged with the unified communication server via an at least one application programming interface, wherein the one or more servers are configured to execute a second or subsequent unified communications application thereon, wherein the second or subsequent unified communications application is different from the first unified communication application; and one or more client devices communicably engaged with the one or more servers via a network communications interface, wherein the one or more client devices are configured to execute one or more instances of the second or subsequent unified communications application, wherein the unified communication server is configured to communicate the received one or more unified communications to each of the second or subsequent unified communications application.

<div align="center">* * * * *</div>